C. F. HEINSS.
SPRING VEHICLE WHEEL.
APPLICATION FILED AUG. 10, 1911.
1,038,576.
Patented Sept. 17, 1912.
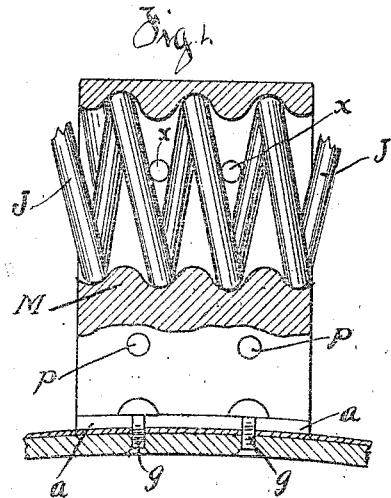
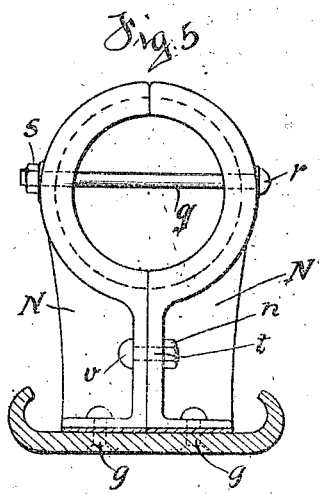
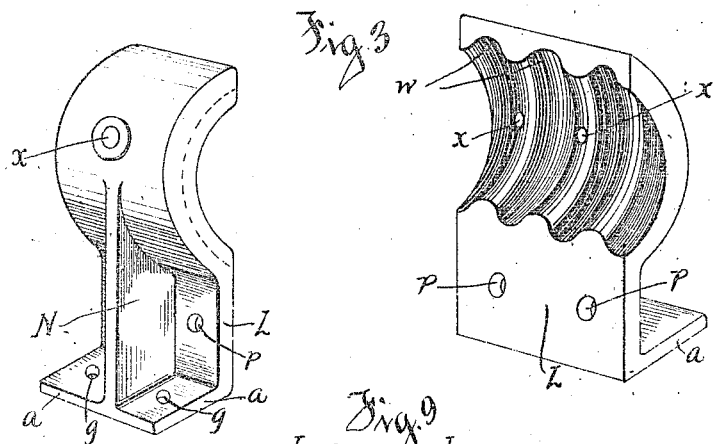
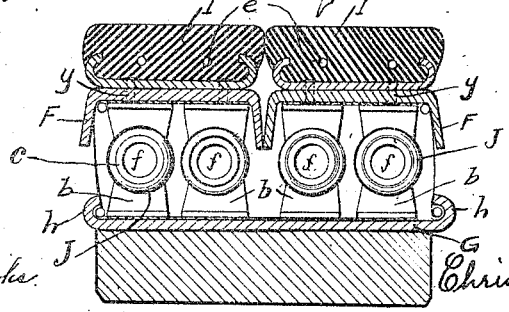

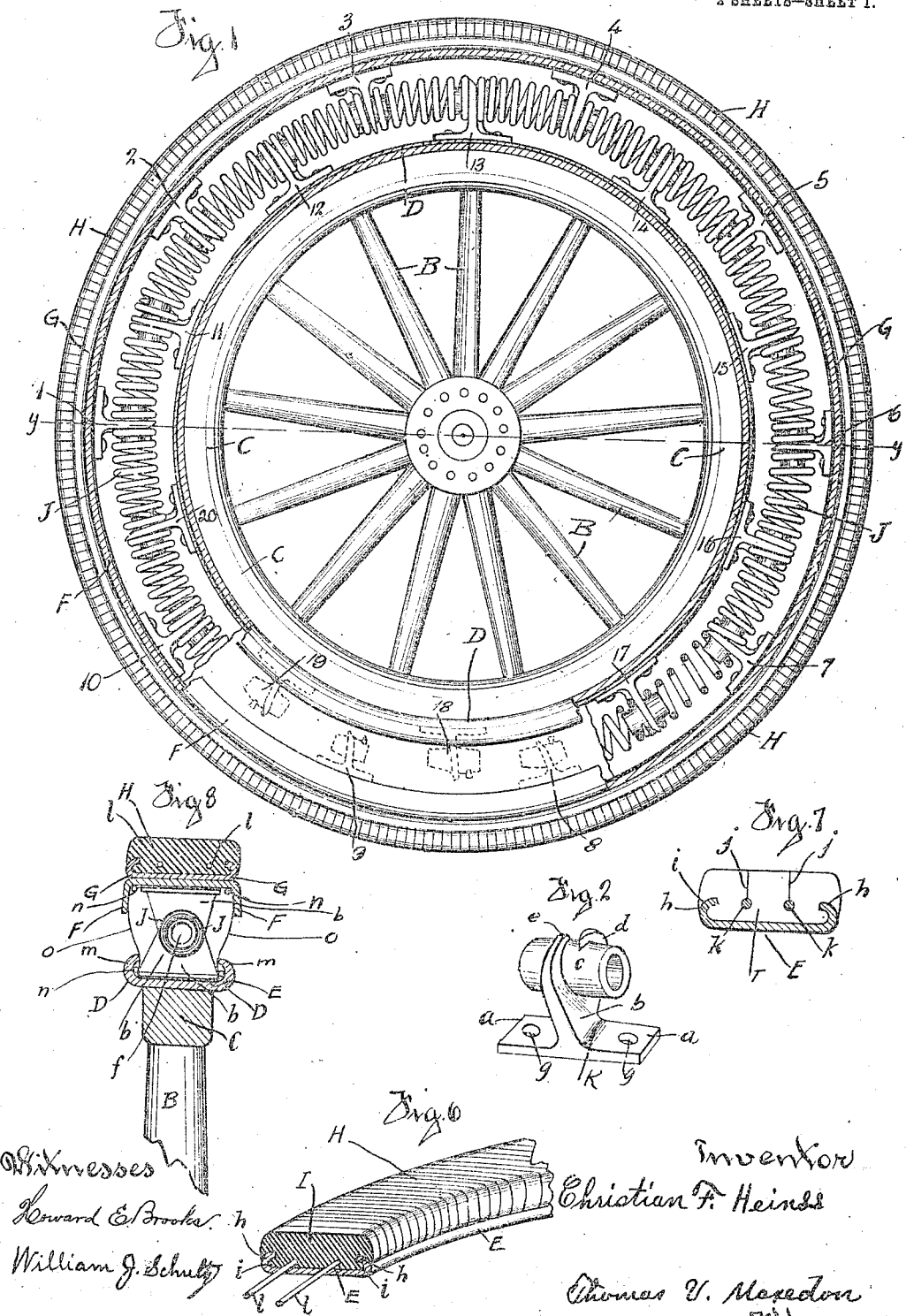

UNITED STATES PATENT OFFICE.

CHRISTIAN F. HEINSS, OF CINCINNATI, OHIO.

SPRING VEHICLE-WHEEL.

1,038,576. Specification of Letters Patent. Patented Sept. 17, 1912.

Application filed August 10, 1911. Serial No. 643,274.

*To all whom it may concern:*

Be it known that I, CHRISTIAN F. HEINSS, a citizen of the United States, residing at Cincinnati, in the county of Hamilton and State of Ohio, have invented new and useful Improvements in Spring Vehicle-Wheels, of which the following is a specification.

My invention relates to vehicle wheels or more particularly to that class of vehicle wheels known as elastic or spring wheels.

The objects of my invention are as follows: First. To provide a vehicle wheel with a metal elastic element interposed between the tire and felly of the wheel for the purpose of absorbing or counteracting as much as possible the jolting and jarring of the vehicle when the wheels run against or over obstructions in their path. Second. To provide a vehicle wheel with a spiral coil of wire interposed between the tire and the felly of the wheel and so positioned and supported that all portions of the vehicle other than the tire itself, and of course its contents, will be completely, continuously and progressively suspended by said coil of wire longitudinally, and not transversely, of the coil. Third. To provide a vehicle wheel with a metal elastic element interposed between the tire and felly of the wheel for the purpose of dispensing with the use of rubber tires and thereby reducing the cost of elastic or spring vehicle wheels. Fourth. To provide a vehicle wheel with a leather tire constructed of pieces and scraps of leather cemented and otherwise bound together so that the weight of the vehicle will be sustained by the leather edgewise rather than flatwise. I accomplish these objects in the manner illustrated in the accompanying drawings of which, Figure 1 is a side elevation of a vehicle wheel provided with my improvement with certain parts cut away in order to illustrate other parts. Fig. 2 is a perspective view of one of the lugs that support the spiral coil of wire. Fig. 3 is a perspective view of a modification of the lug shown in Fig. 2 in which the lug is split into halves and receives the wire inside the barrel-shaped support rather than on the outside. Fig. 4 is a side elevation of one of the halves of said lug as shown in Fig. 3 and intended to illustrate the manner in which the coils of wire lie in the concave grooves, specially designed for them, on the inside of said barrel-shaped support. Fig. 5 is an end elevation of the two halves of said barrel-shaped support, as illustrated in Fig. 3, and intended to illustrate the union of these two halves and how they are bolted together. Fig. 6 is a perspective view of a section of the leather tire showing the manner in which the wire that assists in binding the tire to its tire band passes through the various pieces of which the tire is made. Fig. 7 is a side elevation of one of the pieces of leather of which the tire is made, showing the manner in which the piece of leather is slitted in order to pass edgewise onto the wire that assists in binding it to the tire band. Fig. 8 is a cross-section of one of the spokes of the wheel and all the parts tireward that accompany and are attached to it, the cross-section passing through one of the wire supporting lugs. Fig. 9 is a cross-section of a modification of my improvement illustrating the manner in which a plurality of spiral coils of wire can be employed in order to successfully apply my improvement to the wheels of the heaviest trucks and machines.

Like numerals and like letters represent like parts in all the illustrations.

A indicates the hub of the wheel.
B indicates the spokes of the wheel.
C indicates the felly of the wheel.
D indicates the metal tire of the felly of the wheel.
E indicates the felly lug-band which is gripped by the overturned edges of the felly tire band and in Fig. 3 obscured from view by these overturned edges.
F indicates the tire lug-band which, in Fig. 1, has its in-turned edges cut away, in order to bring to view the bases of the outside set of wire-supporting lugs.
G indicates the tire band.
H indicates the leather tire of the wheel.
I indicates an unslitted, and I' a slitted, integral section of the leather tire.
J indicates the spiral coil of wire.
K indicates one modification, and L indicates another modification, of my wire-supporting lugs. The difference being, in the one modification the barrel-shaped support is integral and engages the spiral coil of wire on the inside of the coils, and in the other instance it is divided into approximately two equal parts and engages the spiral coil of wire on the outside of the coil.
M indicates one of the parts of the last named modification of my wire-supporting lugs and is intended to illustrate the manner in which the coils of wire lie in the concave grooves on the inside of the barrel-shaped supports.

N indicates the manner in which the two parts of my wire-supporting lugs are united and firmly bolted together.

The numerals 1, 2, 3, 4, 5, 6, 7, 8, 9 and 10 indicate the various wire-supporting lugs that are attached to the tire lug-band, and the numerals 11, 12, 13, 14, 15, 16, 17, 18, 19 and 20 indicate the various wire-supporting lugs that are attached to the felly lug-band (not all visible in Fig. 1).

As to the lower case letters, $a$ indicates the base of my wire-supporting lugs.

$b$ indicates the twisted body of my wire-supporting lug, Fig. 3.

$c$ indicates the barrel-shaped support of one modification of my wire-supporting lugs.

$d$ and $e$ indicate opposite projecting points of the two parts into which the twisted body of one modification of my wire-supporting lugs is divided.

$f$ indicates the circular aperture passing longitudinally through the barrel-shaped support of one modification of my wire-supporting lugs.

$g$ indicates the rivet holes in the base of my wire-supporting lugs.

$h$ indicates the in-turned, clamping edges of the tire band.

$i$ indicates the lateral parallel grooves cut into the leather strips of which the leather tire is made, which grooves are engaged by the in-turned edges of the tire band.

$j$ indicates two parallel slits in several of the pieces of which the leather tire is made, by means of which slits the leather pieces can be run sidewise under, and then edgewise onto the two parallel wires that pass through the other pieces of which the leather tire is made.

$k$ indicates the two holes in each of the pieces of which the leather tire is made, into which holes two parallel strands of wire pass for the entire distance around the leather tire band.

$l$ indicates the two strands of wire that pass through the holes $k$ in the leather strips $l$ and assist in binding the leather tire to the tire band. In order to weld the opposite ends of these wires together, it is necessary to leave six or eight inches of their ends free of these leather strips. To fill up this vacancy, a sufficient number of slitted pieces $l$ are run onto these wires in a direction away from the hub of the wheel, so that the un-slitted portion may be held between the wire and the tire band. In running these slitted strips onto the wire, they are interspersed among the unslitted strips, so that no two of them come together. The leather tire having been in this manner prepared for the tire band, it is pressed onto the tire band and the lateral edges of this band are then overturned and pressed into the grooves $i$, by which operation the leather tire is firmly bound to the tire band.

$m$ indicates the in-turned edges of the felly tire.

$n$ indicates the wire to which is attached the opposite edges of the mud-fenders $o$ which extend entirely around the wheel and prevent mud and gravel and other such matter from entering that portion of the wheel occupied by the spiral coil of wire. It is to be noted, however, that these mud-fenders are not by any means absolutely necessary.

$p$ indicates the holes through which pass the bolts $t$, of which bolts $u$ indicates their heads and $v$ their binding nuts.

$r$ indicates the head and $s$ the binding nut of the bolt $q$ which assists bolt $t$ in firmly binding together the two parts of that modification of my wire-supporting lugs illustrated in Figs. 3 and 4.

$w$ indicates the concave grooves cut on the inside of the two parts of that modification of my wire-supporting lugs illustrated in Figs. 3, 4 and 5.

$x$ indicates the holes for bolt $q$, which holes are not, from the nature of the case, diametrically opposite each other but assume a position in keeping with the spiral nature of the coil of wire, so that the bolt $q$ when run through these holes extends angling rather than straight across the aperture $f$. It is to be noted that the bolts $q$ perform a double purpose—one to bind the two parts L together and thereby bring about a support of the spiral coil of wire J transversely of the coils of wire, and the other by directly supporting the spiral coil of wire J longitudinally.

It is to be noted also that, while my improvements give to the vehicle wheel a vertical vibration, they give to it also a horizontal vibration. This last named vibration is brought about when the edge of the tire comes in contact with a stone or other similar obstruction in the road.

It is to be noted also, in assembling and fixing and securing in position the parts E, F and G and the parts J and K (or L as the case may be), that all this work is done before these combined parts are placed on the felly tire D. This having been done, the parts I and 1 are assembled, the wires $l$ welded and the pieces I placed in position and these combined parts pressed onto the tire band G. This having been done, the parts $n$ and $o$ are placed in position and the lateral edges of the felly tire D and tire band G are in-turned. This operation having been performed, all the various parts of my invention are firmly secured to the felly tire D and the felly C.

It is to be noted that all of these parts of which my invention consists can be applied to any automobile or other vehicle wheel.

Having thus described my invention by figures and in detail, I will now describe it as a working mechanism.

The line $y$—$y$ is supposed to pass horizontally through the axis of the hub A and to divide into two equal parts the two wire-supporting lugs 1 and 6, and the wheel is supposed not yet to be placed on the axles of the vehicle. Supposing the wheel to be placed on the axle of the vehicle and the vehicle loaded, the axis of the hub and all portions of the wheel inside of the spiral coil of wire J settle down. In doing this every one of the lugs 1, 2, 3, 4, 5, 6, 7, 8, 9 and 10 becomes a different point of suspension for the vehicle and its load. This suspension is on the spiral coil of wire J and is longitudinal and not transverse of the coils of which the spiral coil of wire J is composed. Each section of the wire between one or the other of the lugs above-mentioned and one or the other of the lugs 11, 12, 13, 14, 15, 16, 17, 18, 19 and 20, is a suspending section either by elongation or compression of the spiral coil of wire, one end of which being attached to one or the other of the first-mentioned set of lugs and the other end of which being attached to one or the other of the second-mentioned set of lugs, and there is never any change made as to the fact of suspension as the wheel progresses, the only change being as to the manner of suspension, or rather as to the angle at which the line of suspension of the weight intersects the circular axis of the spiral coil of wire J. The angle of the line of suspension at lug 13 is approximately 90 degrees; at lug 12 it is approximately 45 degrees; and at lug 11 it is approximately nothing. Below the line $y$—$y$ and at the lug 20 the angle of the line of suspension is approximately nothing; at lug 19 it is approximately 45 degrees; at lug 18 it is approximately 90 degrees; at lug 17 it is approximately 45 degrees; at lug 16 it is approximately nothing; at lug 15 it is approximately nothing; and at lug 14 it is approximately 45 degrees. The greatest angle of suspension is 90 degrees and the smallest is nothing. In the progression of the wheel, every lug, whether of one set or the other, at two different times in every revolution of the wheel pass through every possible angular relation of the line of suspension to the axis of the spiral coil of wire J from an angle of no degrees to that of 90, and twice also from an angle of 90 degrees to that of nothing, so that at every moment in the progress of the wheel there is neither inaction nor overaction of any lug or any coil of wire. In other words, at every revolution of the wheel, every lug is a helper of every other lug, and every coil of wire is a helper, of every other coil of wire, in the suspension of the vehicle and its weight.

In addition to the evident spring of the spiral coil of wire J, the leather tire H also affords a small degree of elasticity. The cumulative elasticity of the two members taken together affords a most excellent spring for both the vehicle and the vehicle and its load.

Having thus described my invention by figures, in detail and as a working mechanism, what I claim and desire to have patented is:—

1. In a vehicle wheel, provided with a felly, and a floating rim separate from the felly, an annular coiled spring intermediate the felly and rim, with the plane of the coils radially disposed, and a series of lugs secured alternately to the felly and the rim and projecting radially toward each other for supporting the spring free from the felly and the rim, each of said lugs engaging said spring uniformly around the circumference of the coil, whereby uniform pressure may be applied between the lugs, and the tendency of the coil to buckle between the points of suspension is avoided.

2. In a vehicle wheel, provided with a felly, and a floating rim separate from the felly, an annular coiled spring intermediate the felly and rim, with the plane of the coils radially disposed, and a series of lugs secured alternately to the felly and the rim and projecting radially toward each other for supporting the spring free from the felly and the rim, each of said lugs engaging said spring circumferentially of its coils, said lugs being divided and embracing the coil from the outside.

3. In a vehicle wheel, provided with a felly, and a floating rim separate from the felly, an annular coiled spring intermediate the felly and rim, with the plane of the coils radially disposed, and a series of lugs secured alternately to the felly and the rim and projecting radially toward each other for supporting the spring free from the felly and the rim, each of said lugs engaging said spring circumferentially of its coils, said lugs being divided and formed with screw threads on the inner surface, with means for locking the parts together to provide a screwthreaded socket for the coil.

In testimony whereof I have hereunto set my hand in presence of two subscribing witnesses.

CHRISTIAN F. HEINSS.

Witnesses:
HOWARD E. BROOKS,
WILLIAM J. SCHULTZ.